United States Patent [19]

Zimlich

[11] Patent Number: 5,894,727
[45] Date of Patent: Apr. 20, 1999

[54] METHOD AND SYSTEM FOR GENERATING AN INFERRED EGO SIGNAL IN AN ASYMMETRICAL Y-PIPE EXHAUST SYSTEM

[75] Inventor: Glenn Alden Zimlich, Dearborn Heights, Mich.

[73] Assignee: Ford Global Technologies, Inc., Dearborn, Mich.

[21] Appl. No.: 08/963,357

[22] Filed: Nov. 3, 1997

[51] Int. Cl.⁶ ............................... F01N 3/20; F02D 41/00
[52] U.S. Cl. .................... 60/274; 60/276; 60/277; 123/692
[58] Field of Search ........................ 60/274, 276, 277; 123/691, 692

[56] References Cited

U.S. PATENT DOCUMENTS

| | | | |
|---|---|---|---|
| 4,088,096 | 5/1978 | Bossi et al. | 60/276 X |
| 4,134,261 | 1/1979 | Iizuka et al. | 60/276 |
| 5,074,113 | 12/1991 | Matsuoka | 60/276 |
| 5,099,647 | 3/1992 | Hamburg | 60/274 |
| 5,228,287 | 7/1993 | Kuronishi et al. | 60/276 |
| 5,247,793 | 9/1993 | Yamada et al. | 60/276 |
| 5,279,114 | 1/1994 | Kurita et al. | 60/276 |
| 5,319,921 | 6/1994 | Gopp | 60/274 |
| 5,357,751 | 10/1994 | Orzel | 60/274 |
| 5,377,484 | 1/1995 | Shimizu | 60/276 |
| 5,381,656 | 1/1995 | Orzel et al. | 60/274 |
| 5,385,016 | 1/1995 | Zimlich et al. | 60/274 |
| 5,417,058 | 5/1995 | Shimizu | 60/276 |
| 5,511,377 | 4/1996 | Kotwicki | 60/274 |
| 5,544,481 | 8/1996 | Davey et al. | 60/274 |
| 5,570,574 | 11/1996 | Yamashita et al. | 60/276 |
| 5,749,221 | 5/1998 | Kawahira et al. | 60/274 |

*Primary Examiner*—John E. Ryznic
*Attorney, Agent, or Firm*—Allan J. Lippa; Roger L. May

[57] ABSTRACT

A method and system for generating an inferred EGO sensor signal for use in monitoring operation of a catalytic convertor in an asymmetrical Y-pipe vehicle exhaust system utilizes current engine airflow and engine speed readings as address inputs for a look-up table of predetermined time delay values. The addressed time delay values are used to retrieve previously stored upstream EGO sensor signals corresponding to the time delay values. An inferred EGO sensor signal is then generated based on the retrieved EGO sensor signals, thus providing an inferred EGO sensor signal which accounts for the exhaust transport delay down the different respective exhaust pipe legs.

19 Claims, 2 Drawing Sheets

METHOD AND SYSTEM FOR GENERATING AN INFERRED EGO SIGNAL IN AN ASYMMETRICAL Y-PIPE EXHAUST SYSTEM

TECHNICAL FIELD

The present invention generally relates to vehicle air/fuel and emission control systems, and more specifically to a system for monitoring operation of a catalytic convertor located in an engine exhaust.

BACKGROUND ART

Recent legislative developments now require on-board monitoring of a vehicle exhaust catalytic convertor efficiency as part of the vehicle's air/fuel and emission control operation. Such monitoring is typically accomplished by placing an exhaust gas oxygen (EGO) sensor before and after the catalyst. The outputs EGO sensors are processed to quantify exhaust gas perturbations caused by rich-lean air/fuel mixture switches during operation of the engine. Examples of prior monitoring arrangements are disclosed in U.S. Pat. No. 5,357,751 to Orzel, which shows monitoring of a single inlet/outlet type catalytic convertor, and U.S. Pat. No. 5,385,016 to Zimlich et al. which shows monitoring of a Y-pipe exhaust system having two upstream EGO sensors and one downstream EGO sensor.

Of particular concern to the present invention is a monitoring arrangement for Y-pipe exhaust systems. Generally, the arrangement taught in U.S. Pat. No. 5,385,016 is able to provide monitoring without placing a third upstream EGO sensor at the Y-pipe junction, i.e., the exhaust bank blending location, by using the two upstream EGO sensor outputs to infer what the likely blended EGO sensor output would be.

One potential source of error in such an inferred EGO arrangement relates to the phase coherency of the two independent fuel control banks on the engine. More specifically, as one bank falls out of phase with the other, rich-lean exhaust gas pulsations cancel each other out. In a symmetrical y-pipe exhaust system (i.e., the exhaust paths from separate exhaust manifolds to the Y-pipe junction are the same length), the phasing of the banks can be used to control switching of the selected inferred EGO signal.

However, in an asymmetrical exhaust system configuration, the different exhaust path lengths cause the banks to fall in and out of phase without regard to upstream phase coherency. As a result, a need exists for a way of ensuring accuracy in an inferred EGO sensor signal for asymmetrical Y-pipe exhaust systems.

DISCLOSURE OF THE INVENTION

It is, therefore, an object of the present invention to provide a system and method for generating an inferred EGO sensor signal in an asymmetrical Y-pipe exhaust system which automatically incorporates exhaust pipe time delays, thereby improving overall accuracy of both the inferred signal and the monitoring of catalytic convertor operation.

In accordance with this and other objects, the present invention provides a method and system for generating an inferred EGO sensor signal for use in a system for monitoring operation of a catalytic convertor connected to a vehicle engine via an asymmetrical Y-pipe exhaust configuration, wherein the method in accordance with one embodiment of the present invention includes sampling an output signal of a first EGO sensor coupled to a shorter length one of the exhaust banks of the Y-pipe configuration, and storing the samples in a time sequential order. Values are then obtained for current engine airflow and engine speed, and a time delay value is determined based on the obtained engine airflow and engine speed values. The inferred EGO sensor signal is generated by selecting one of the previously stored EGO output samples based on the determined time delay value. The time delay value is derived based on the difference in time delays for the two different exhaust banks in the asymmetrical Y-pipe configuration.

In accordance with another embodiment, a second EGO sensor is coupled to the other exhaust bank, wherein the output signal is sampled and stored, and separate time delay values are determined for each exhaust bank. The inferred EGO sensor signal is then determined as the greater of the retrieved samples corresponding to the different time delay values.

In accordance with one aspect of the present invention, the step of determining time delay values comprises applying the obtained engine airflow and speed values as inputs to a look-up table of predetermined values, wherein the respective time delay values are used to retrieve an EGO output sample previously stored in time corresponding to the respective time delay value.

In further accordance with one embodiment of the present invention, a system for generating an inferred EGO sensor signal for monitoring operation of a catalytic convertor in an asymmetrical Y-pipe vehicle exhaust system includes a first exhaust gas oxygen (EGO) sensor coupled to a shorter length one of the exhaust legs of the asymmetrical Y-pipe exhaust system, and a control processor coupled to the first EGO sensor for sampling and storing sensor output signals in a time sequential order. An engine airflow sensor and an engine speed sensor are coupled to the engine and the control processor for providing signals representative of engine airflow and speed. The control processor is arranged to determine a time delay value based on the engine airflow and speed signals, and to generate an inferred EGO sensor signal by selecting one of the stored EGO output samples based on the time delay value.

In accordance with another embodiment, a second EGO sensor is coupled to the other exhaust bank leg of the asymmetrical Y-pipe exhaust system and to the control processor, wherein the control processor is arranged to determine a time delay value for each exhaust bank based on the engine airflow and speed signals, and to generate an inferred EGO sensor signal by selecting one of the stored EGO output samples based on the time delay values.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
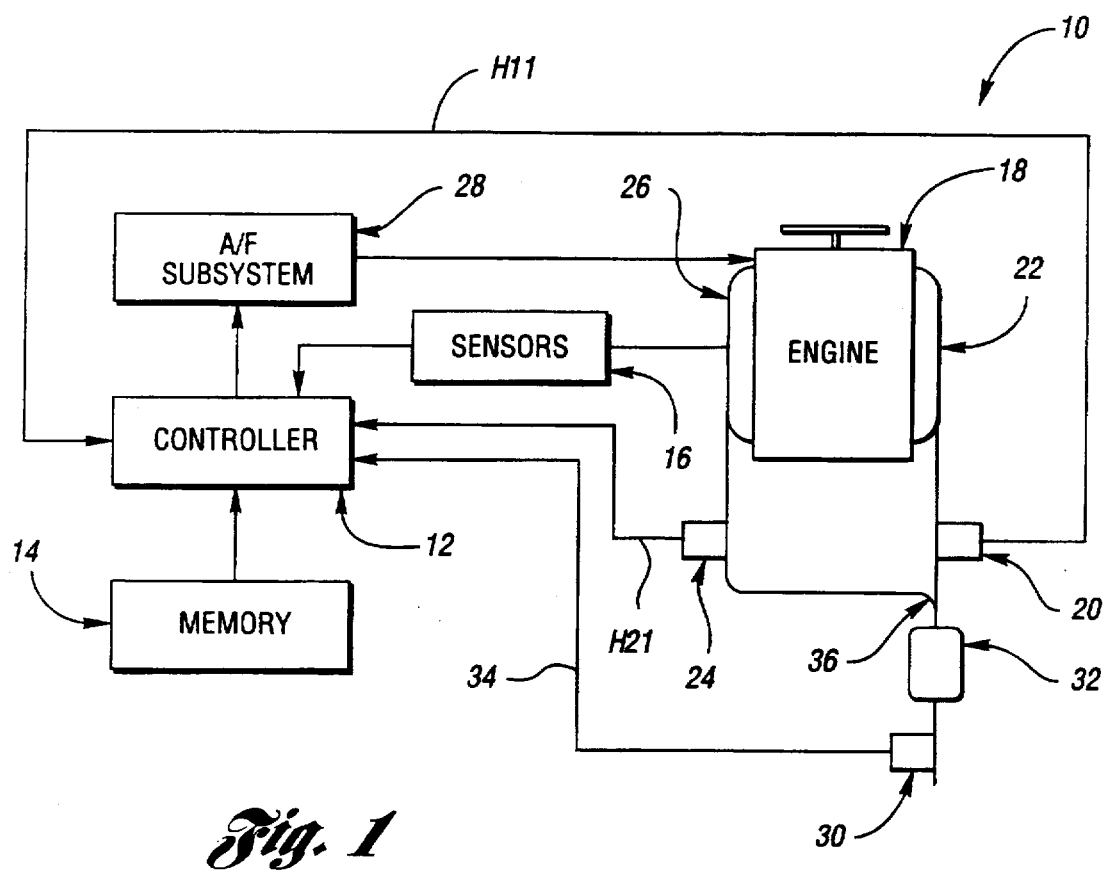
FIG. 1 is a block diagram of a system for monitoring catalytic convertor operation in an asymmetrical vehicle exhaust system.

Referring to FIG. 1, a system for monitoring operation of an exhaust catalytic convertor for efficiency in an exhaust system having an asymmetrical Y-pipe exhaust pipe includes a control subsystem 12 formed from a microprocessor unit. Control subsystem is provided with appropriate input and output ports for connection to the other components of the system, and a memory arrangement 14 including a read only memory for storing the controlled program, a random access memory for temporary data storage which may also be used for counters or timers, and a keep alive memory for storing learned values.

Control subsystem 12 receives signals from various conventional sensors 16 coupled to engine 18 including: measurement of inducted mass airflow (MAF), engine coolant temperature, and indication of engine speed (RPM) from a tachometer.

An output signal H11 is provided from a conventional exhaust gas oxygen sensor 20 coupled to an exhaust manifold 22 which, in this particular example, is coupled to the right hand cylinder bank of engine 18. Similarly, an output signal H21 is provided by a conventional exhaust gas oxygen sensor 24 coupled to left hand exhaust manifold 26. An air/fuel (A/F) control subsystem 28 operates by comparing H11 and H21 to a respective reference value associated with stoichiometry to generate respective air/fuel ratio control signals in a manner generally known in the art.

A/F control subsystem 28 includes a fuel supply and delivery system, one or more electronic fuel injectors which deliver fuel in response to a control signal pulse width, and an associated throttle control arrangement.

A third conventional exhaust gas oxygen sensor 30 is coupled to the engine exhaust downstream of a catalytic converter 32 and provides a signal 34 to control subsystem 12 which is related to oxygen content in the exhaust gases. As with the signal H11 and H21, signal 34 is also compared to a reference value associated with stoichiometry to facilitate additional control by A/F control subsystem 28.

Figure 2:
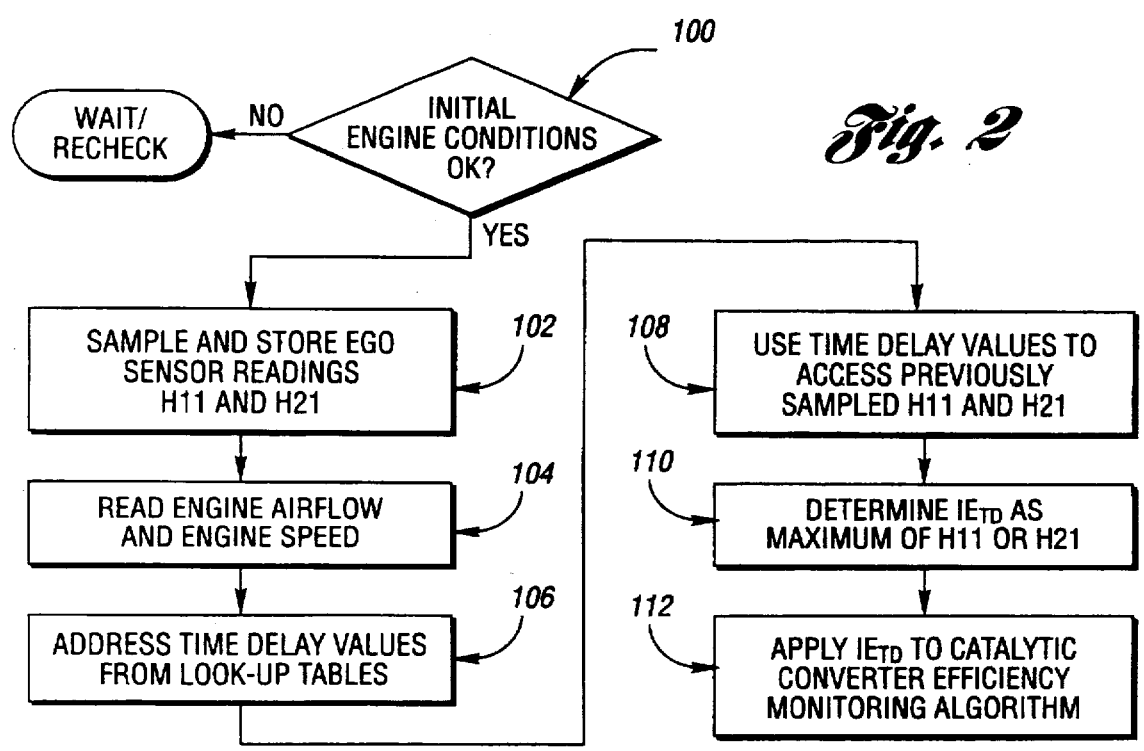
FIG. 2 is a flowchart illustrating generation of an inferred EGO signal in accordance with a first embodiment of the present invention.

Referring now to FIG. 2, a method is shown in accordance with one embodiment of the present invention for generating an inferred EGO sensor signal for use in monitoring the operation of catalytic convertor 32. An inferred signal IE is generated as a best guess as to the likely output of a hypothetical EGO sensor exposed to a hypothetical blended mixture of exhaust gases from right hand exhaust manifold 22 and left hand exhaust manifold 26 at Y-pipe junction 36. The method begins at block 100 by checking for initial engine conditions before entering the test cycle described below. Examples of such entry conditions include determining that the engine temperature is within a predetermined range, an inferred (i.e., modeled) or actual exhaust or catalytic convertor temperature is within a predetermined range, a predetermined time has elapsed since the engine was started, and a closed loop air/fuel control has been operable for at least a preselected time.

At block 102, both signal H11 and signal H21 are sampled and stored in a time sequential manner. As described below, a time delay value is addressed from a look-up table to determine which sample should be selected for use as the inferred EGO sensor signal (IE). However, unlike symmetrical Y-pipe exhaust systems, the exhaust banks of an asymmetrical exhaust system fall in and out of phase without regard to upstream phase coherency. As a result, the inferred EGO sensor signal can not be generated based solely on H11 and H21, but rather must account for such additional factors as engine airflow, engine speed, exhaust temperature and exhaust tube diameter.

Thus, a set of exhaust system time delay values i and j corresponding to each exhaust bank are empirically determined for various engine operating conditions and stored in separate look-up tables, i.e., table i could correspond to one exhaust bank, while table j could correspond to the other exhaust bank. Values for engine airflow and engine speed are read at block 104, and used at block 106 as inputs to address the appropriate delay value from the look-up tables, e.g., the row number can correspond to engine airflow, and the column number can correspond to engine speed. This process is performed for both exhaust banks.

After addressing the appropriate time delay values for each bank, these values are respectively used to retrieve a previously stored H11 and H21 value as shown at block 108. At block 110, $IE_{TD}$ is then determined in accordance with one embodiment as being equal to the greater of the two retrieved H11 and H21 values. Stated as a function, an inferred Y-pipe signal which accounts for exhaust transport delay down the asymmetrical exhaust pipe is generated as follows:

$$IE_{TD} = [MAX [H11_i \text{ (volts) or } H21_j \text{ (volts)}]],$$

where i and j represent H11 and H21 values which were stored in the time sequence corresponding to the respective addressed time delay values. However, while this represents one embodiment, those skilled in the art will recognize that a multitude of inferred Y-pipe EGO signal algorithms could be used to determine $IE_{TD}$ based on the stored time delay values, with one such example being taught in the aforementioned U.S. Pat. No. 5,385,016 which is incorporated by reference herein.

Figure 3A:
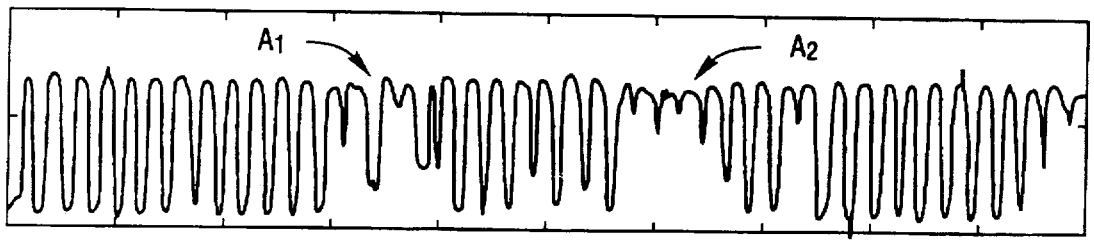
FIGS. 3(a)–(c) are plots showing asymmetrical EGO sensor outputs, and corresponding inferred and time delayed inferred EGO sensor signals.
Figure 3B:
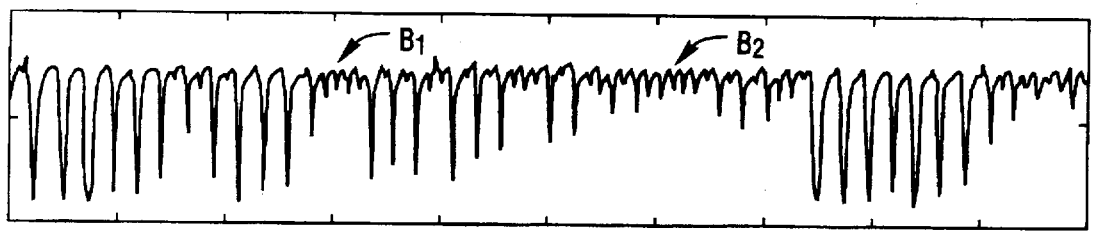
Figure 3C:
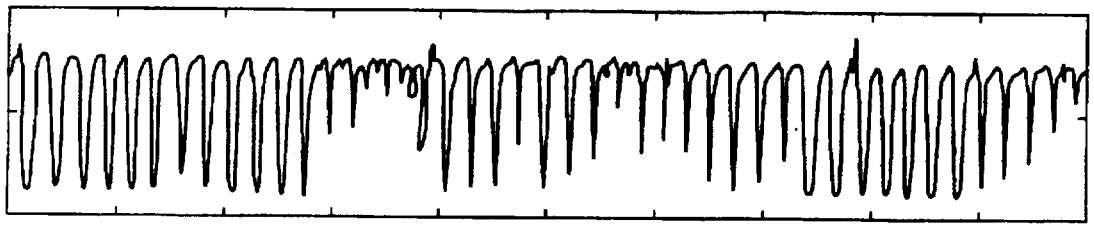

FIGS. 3(a)-(c) show a set of EGO signal plots illustrating the improved accuracy in inferred asymmetrical Y-pipe EGO signal when incorporating exhaust system time delays in accordance with the present invention. More specifically, FIG. 3(a) illustrates the cancellation effect in H11 and H21 at regions $A_1$ and $A_2$. FIG. 3(b) shows an inferred EGO sensor signal without time delays. As seen at regions $B_1$ and $B_2$, the inferred EGO signal is compromised by the H11 and H21 signal cancellations. Finally, FIG. 3(c) shows an inferred EGO sensor signal $IE_{TD}$ incorporating the time delays of the present invention. As can be seen, $IE_{TD}$ is less susceptible to the signal cancellations.

As shown at block 112 of FIG. 2, once $IE_{TD}$ has been determined, the value can then be supplied as a factor for use in monitoring catalytic convertor efficiency, such as taught in U.S. Pat. No. 5,385,016, and again incorporated by reference herein.

Figure 4:
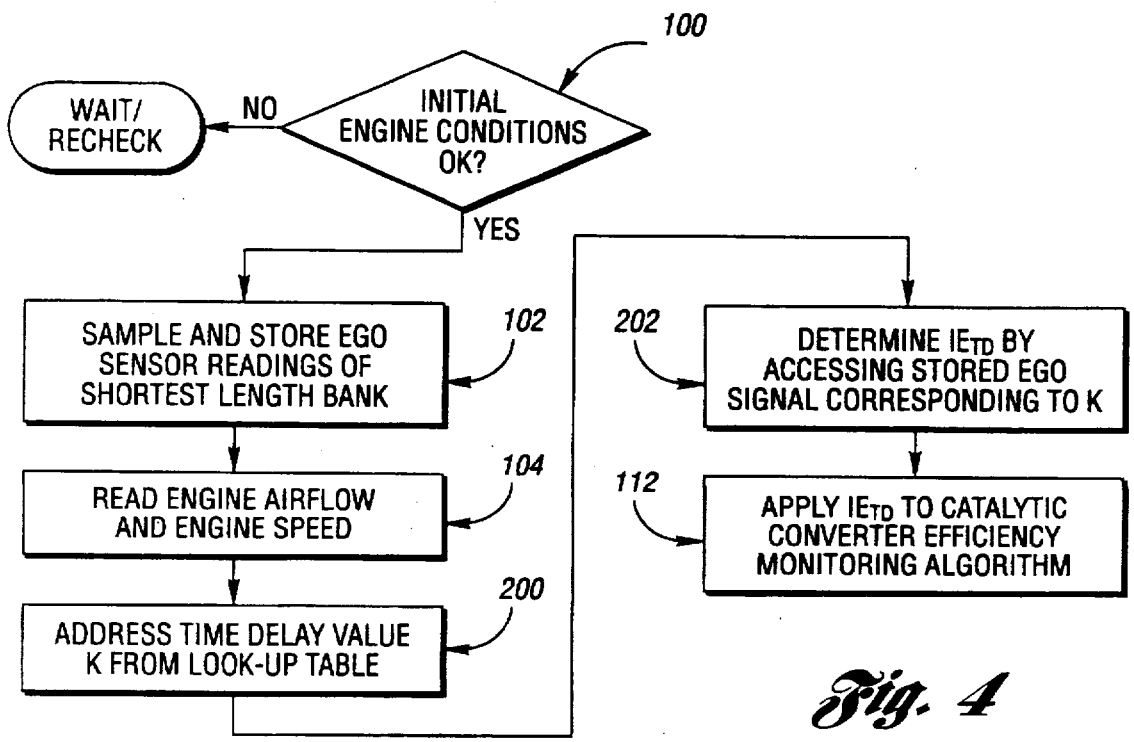
FIG. 4 is a flowchart illustrating generation of an inferred EGO signal in accordance with a second embodiment of the present invention.

Referring now to FIG. 4, a second embodiment in accordance with the present invention is shown for generating an inferred EGO sensor signal for use in the monitoring operation of catalytic convertor 32. More specifically, the method of FIG. 4 is similar to that described in connection with FIG. 2, except that instead of two separate time delay values i and j correspondingly derived for each exhaust bank of the engine, a single time delay value k can be empirically determined as the difference in time delay between i and j. Thus, after engine airflow and engine speed are determined at block 104, time delay value k is addressed from the look-up table at block 200. Then, at block 202 $IE_{TD}$ is determined by using the time delay value to access the previously sampled EGO signal corresponding to the shorter of the two asymmetrical Y-pipe exhaust banks, e.g., H11 as shown in FIG. 1. This produces a relative time alignment of the two exhaust banks suitable for application to the catalytic convertor efficiency monitoring algorithm as denoted by block 112.

While the best mode for carrying out the invention has been described in detail, those familiar with the art to which this invention relates will recognize various alternative designs and embodiments for practicing the invention as defined by the following claims.

What is claimed is:

1. In a system for monitoring operation of a vehicle exhaust catalytic convertor, said catalytic convertor being connected to at least two engine exhaust manifolds by way of an asymmetrical Y-pipe exhaust configuration, a method for generating an inferred exhaust gas oxygen (EGO) sensor signal at the Y-pipe junction comprises:

sampling over a period of time an output signal of a first EGO sensor coupled to a shorter one of the exhaust banks of the asymmetrical Y-pipe configuration;

storing the samples in a time sequential order;

obtaining values for current engine airflow and engine speed;

determining a time delay value based on said obtained engine airflow and engine speed values; and generating the inferred EGO sensor signal by selecting one of the previously stored EGO output samples based on the determined time delay value.

2. The method of claim 1 further comprising:

sampling an output signal from a second EGO sensor coupled to the other exhaust bank of the Y-pipe configuration;

determining a time delay value for both banks of the Y-pipe configuration based on said obtained engine airflow and engine speed values; and generating the inferred EGO sensor signal by selecting one of the previously stored EGO output samples based on the determined time delay values.

3. The method of claim 2 wherein the step of determining time delay values comprises applying the obtained engine airflow and speed values as inputs to separate look-up tables of predetermined values for each exhaust bank.

4. The method of claim 3 wherein said time delay values are used to retrieve an EGO output sample for each exhaust bank previously stored in time corresponding to the respective time delay value.

5. The method of claim 4 wherein the inferred EGO sensor signal is selected as the greater of the retrieved EGO output samples.

6. The method of claim 2 wherein said time delay values are used to retrieve an EGO output sample for each exhaust bank previously stored in time corresponding to the respective time delay value.

7. The method of claim 6 wherein the inferred EGO sensor signal is selected as the greater of the retrieved EGO output samples.

8. The method of claim 1 wherein the step of determining a time delay value comprises applying the obtained engine airflow and speed values as inputs to a look-up table of predetermined values for the shorter length exhaust bank.

9. The method of claim 8 wherein said time delay value is used to retrieve a first EGO output sample previously stored in time corresponding to the respective time delay value.

10. The method of claim 1 wherein the time delay value is determined based on a difference in time delay for the two respective exhaust banks of the asymmetrical Y-pipe configuration.

11. A system for generating an inferred EGO sensor signal for use in monitoring operating of a catalytic convertor in an asymmetrical Y-pipe vehicle engine exhaust system, said system comprising:

a first exhaust gas oxygen (EGO) sensor coupled to one exhaust bank leg of the asymmetrical Y-pipe exhaust system;

a control processor coupled to said first EGO sensor for sampling and storing sensor output signals in a time sequential order; and an engine airflow sensor and an engine speed sensor coupled to the engine and said control processor for providing signals representative of engine airflow and speed, wherein said control processor is arranged to determine a time delay value based on the engine airflow and speed signals, and to generate an inferred EGO sensor signal by selecting one of the stored EGO output samples based on the time delay value.

12. The system of claim 11 further comprising a second EGO sensor coupled to the other exhaust bank leg of the asymmetrical Y-pipe exhaust system and to said control processor, wherein said control processor is arranged to determine a time delay value for each exhaust bank based on the engine airflow and speed signals, and to generate an inferred EGO sensor signal by selecting one of the stored EGO output samples based on the time delay values.

13. The system of claim 11 wherein said control processor comprises a memory arrangement having a separate look-up table of predetermined time delay values for each exhaust bank.

14. The system of claim 13 wherein said control processor is further arranged to apply the engine airflow and speed signals as address inputs for each look-up table.

15. The system of claim 14 wherein said control processor is further arranged to retrieve an EGO output sample for each exhaust bank previously stored in time corresponding to the respective time delay value.

16. The system of claim 15 wherein in said control processor is further arranged to generate the inferred EGO sensor signal by selecting the greater of the retrieved EGO output samples.

17. The system of claim 11 wherein said control processor comprises a memory arrangement having a look-up table of predetermined time delay values for the shorter exhaust bank.

18. The system of claim 17 wherein said control processor is further arranged to apply the engine airflow and speed signals as address inputs for the look-up table.

19. The system of claim 11 wherein the time delay value comprises a difference in time delay for the two respective exhaust banks of the asymmetrical Y-pipe configuration.

* * * * *